Figure 1:
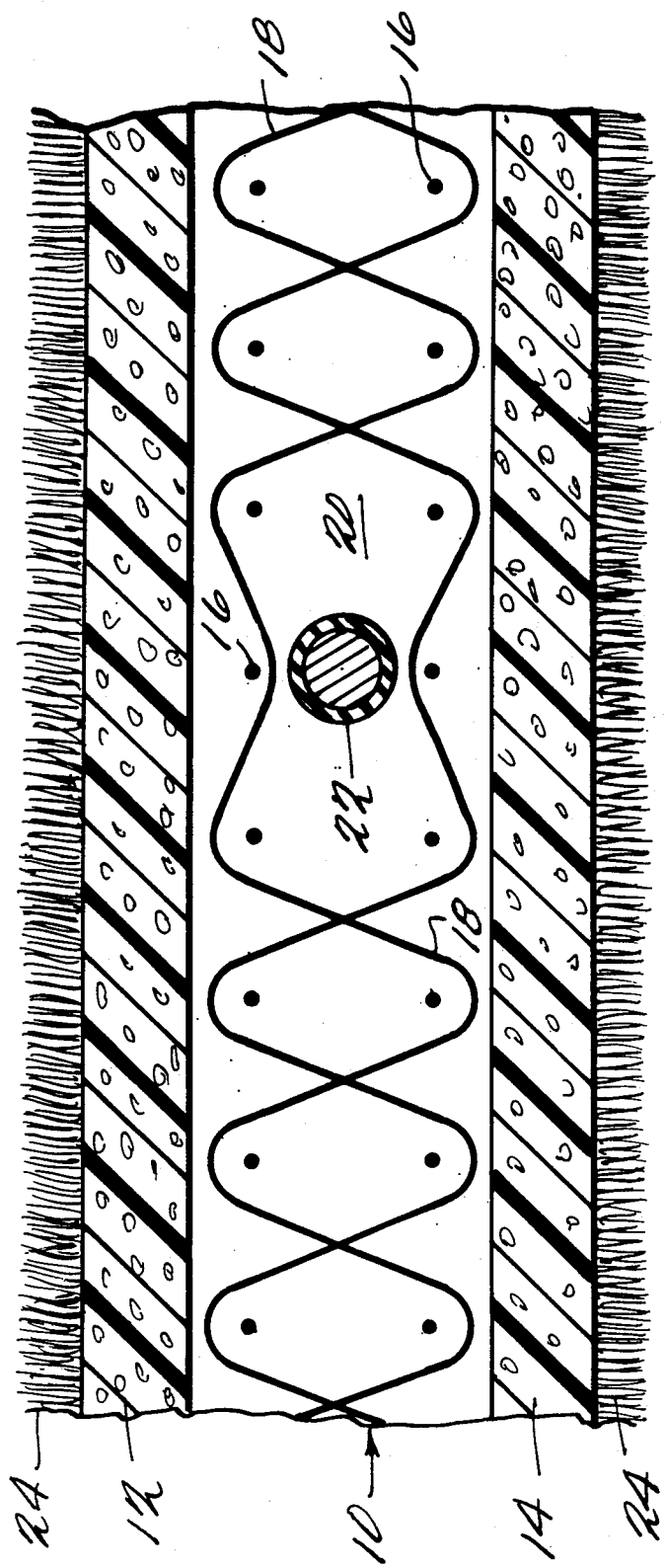

United States Patent [19]

Spencer

[11] Patent Number: 4,459,461
[45] Date of Patent: Jul. 10, 1984

[54] FLOCKED ELECTRIC BLANKET CONSTRUCTION

[75] Inventor: Francis T. Spencer, Biddeford, Me.

[73] Assignee: West Point Pepperell, Inc., West Point, Ga.

[21] Appl. No.: 425,996

[22] Filed: Sep. 28, 1982

[51] Int. Cl.³ .............................. B32B 5/08; H05B 3/18
[52] U.S. Cl. ...................................... 219/212; 219/529
[58] Field of Search ............... 219/212, 211, 528, 529; 428/90, 95; 139/425 R

[56] References Cited

U.S. PATENT DOCUMENTS

| | | | |
|---|---|---|---|
| 1,456,223 | 5/1923 | Craddick et al. | 219/212 |
| 2,203,918 | 6/1940 | Moberg | 219/212 |
| 2,490,417 | 12/1949 | Cochran | 219/212 |
| 2,706,768 | 4/1955 | Kaplan | 219/212 |
| 2,708,235 | 5/1955 | Kaplan | 219/212 |
| 2,715,674 | 8/1955 | Abbott et al. | 219/212 |
| 3,028,477 | 4/1962 | Russell | 219/528 |
| 3,215,584 | 11/1965 | McConnell et al. | 428/90 |
| 3,425,020 | 1/1969 | Toyooka et al. | 219/529 |
| 3,436,245 | 4/1969 | Grandman | 428/90 |
| 3,472,289 | 10/1969 | Webber et al. | 219/529 |
| 3,478,422 | 11/1969 | Inui | 219/212 |
| 3,513,297 | 5/1970 | Jordan | 219/529 |
| 3,528,874 | 9/1970 | Spencer | 428/89 |
| 3,600,261 | 8/1971 | Kerres | 428/95 |
| 3,946,193 | 3/1976 | Giese | 219/211 |
| 3,968,283 | 7/1976 | Schutte | 428/90 |
| 3,973,066 | 8/1976 | Smith et al. | 219/212 |
| 4,076,878 | 3/1978 | Norby | 428/90 |

FOREIGN PATENT DOCUMENTS 7203275  9/1972  Netherlands ................. 428/90

Primary Examiner—Roy N. Envall, Jr.
Assistant Examiner—Geoffrey S. Evans
Attorney, Agent, or Firm—Cushman, Darby & Cushman

[57] ABSTRACT

A flocked electric blanket construction is provided wherein a fabric substrate woven from filament yarn is interposed between, and is bonded to, layers of foam. The exposed surfaces of the foam are flocked. The substrate includes channels woven into the fabric to receive electrical heating wires.

5 Claims, 1 Drawing Figure

FLOCKED ELECTRIC BLANKET CONSTRUCTION

BACKGROUND OF THE INVENTION

Conventional electrical blankets comprise a woven fabric having the warp and filling ends so interlaced that at desired intervals channels are formed through which the wires of the heating element are drawn. The fabric is produced from spun fibers which are napped so that the blanket's finish appears quite similar to a nonelectric blanket. In use, the nap entraps air warmed by current flow through the wires so as to distribute heat throughout the blanket.

A deficiency of electric blankets of the type just described is that the nap tends to "pill" and become nonuniform as the blanket is subjected to use. This is detrimental not only to the blanket's appearance, but also with respect to its ability to evenly maintain the heat generated by the electrical elements. As a result, "hot spots" develop in the blanket.

In U.S. Pat. No. 3,528,874 which issued on Sept. 15, 1970, there is disclosed a blanket construction completely different from a conventional napped blanket. More particularly, an open mesh scrim substrate is interposed between layers of foam. The exposed surfaces of the foam are flocked to give a luxurious appearance and feel to the construction. The resultant product also is lightweight, supple and durable.

Inasmuch as the foam layers in a flocked blanket include permanent air cells, such a construction appeared attractive for modification to an electric blanket since air entrapped in the foam cells could be heated to uniformly distribute the heat throughout the blanket without concern that deterioration would produce "hot spots". Accordingly, efforts were undertaken to produce such a blanket.

In accordance with U.S. Pat. No. 3,528,874, the foam surfaces which face the scrim are flame-laminated together. This is possible because the scrim interposed between the foam layers is a very open mesh. Obviously, however, such a flame-lamination process does not lend itself to the formation of the channels required to receive electrical heating wires.

In order to overcome this problem, a flocked electric blanket was constructed by adhesively bonding first and second layers of polyurethane foam to respective sheets of nylon tricot fabric. The exposed surface of one of the nylon tricot sheets then was subjected to the selective application of adhesive so that when the two tricot sheets were brought together, channels were formed in accordance with the adhesive pattern. Thereafter, the exposed surfaces of the foam were flocked and the heating wires were inserted within the channels to complete the blanket construction.

The technique for producing a flocked electric blanket just described suffered several deficiencies. An important shortcoming was the expense of production resulting from the several adhesion steps of the process which required considerable time to accomplish. Furthermore, because of the use of the tricot sheets, the resultant blanket was quite stiff and considerably heavier than conventional flocked blankets.

The deficiencies just described cannot be overcome by using in place of tricot the woven fabric employed in conventional napped electric blankets. This is because a fabric suitable for napping must be formed from spun fibers, and to provide strength to such a fabric, coarse yarns must be included. In a flocked blanket, the use of a nappable fabric as a substrate would impart stiffness, weight and expense to the product. Also, its coarse yarns would produce a corduroy-like appearance in the finished blanket.

SUMMARY OF THE INVENTION

In order to overcome the foregoing shortcomings and problems in forming a flocked electric blanket, the present invention utilizes as a substrate a lightweight fabric woven of filament yarns. Since filaments cannot be napped, they are not suitable for conventional electric blankets. However, the use of filaments in a flocked blanket construction provides the tensile strength necessary to prevent the foam layers from being torn apart in everyday use. The filament fibers are woven so as to form the necessary channels for receiving the heating wires. Layers of foam are bonded to opposite sides of the fabric, and the exposed foam surfaces are flocked in the usual manner. The construction is completed by inserting heating wires into the channels.

DETAILS OF THE INVENTION

The invention will be described in further detail with respect to the accompanying drawing wherein:

FIG. 1 is an exploded enlarged sectional view of a portion of an electric blanket construction according to the present invention.

Referring to the drawing, a substrate 10 is illustrated in interposed relationship between two layers of foam 12 and 14. The substrate is a fabric woven from filament yarns. For the flocked blanket construction disclosed, a tensile strength of at least 20 lbs. is required for the substrate to prevent the blanket from being torn apart in use. However, with filament yarns, this level of tensile strength can be obtained by the use of relatively fine yarns both in the warp and filling directions. These yarns are identified as 16 and 18, respectively. A suitable range for such yarns is approximately 150–250 denier, and a typical density of weave is about 15 warp and filling ends per inch. It will be understood, however, that since the tensile strength of the substrate 10 is a function of both the denier of the filament yarn and the number of ends per inch, the values just given are exemplary only, and other combinations are possible to achieve the desired tensile strength.

By employing filament yarns in the manner just described, a fabric of relatively open weave is produced.

In order to accommodate heating wires, the warp and filling yarns are interlaced in a conventional manner so as to produce channels at desired intervals. One such channel 20 is illustrated in FIG. 1, and a wire 22 is shown disposed within the channel.

The layers 12 and 14 preferably are polyurethane foam which are flame-laminated to substrate 10. However, it also is possible to bond one or both of the foam layers to the fabric by suitable adhesives.

Flock 24 is applied to the exposed surfaces of the foam layers in a conventional manner, as described more fully in U.S. Pat. No. 3,528,874.

The product which has been described is lightweight, supple, durable and relatively economical to produce. In addition to these advantages, it also has the luxurious appearance and feel which characterize a flocked blanket construction.

What is claimed is:

1. An electric blanket construction comprising:

a fabric substrate woven from filament yarn, said fabric being woven in such a manner as to define channels at spaced intervals within the fabric which are adapted to receive electrical heating wire;

a layer of foam bonded to each surface of the fabric substrate; and flock adhered to surfaces of the foam layers opposite those bonded to the substrate.

2. An electric blanket construction as set forth in claim 1, wherein said substrate has a tensile strength of at least 20 lbs.

3. An electric blanket construction as set forth in either of claims 1 or 2, wherein said filament yarn is in the range of 150–250 denier.

4. An electric blanket construction as set forth in either of claims 1 or 2, wherein said foam layers are polyurethane.

5. An electric blanket construction as set forth in claim 3, wherein said foam layers are polyurethane.

* * * * *